(12) United States Patent
Pieterman

(10) Patent No.: US 11,297,999 B2
(45) Date of Patent: Apr. 12, 2022

(54) BLENDER CLEANING TOOL

(71) Applicant: KUHN NOMINEES PTY LTD, Cowell (AU)

(72) Inventor: Jade Pieterman, Cowell (AU)

(73) Assignee: KUHN NOMINEES PTY LTD

( * ) Notice: Subject to any disclaimer, the term of this patent is extended or adjusted under 35 U.S.C. 154(b) by 346 days.

(21) Appl. No.: 16/328,751

(22) PCT Filed: Aug. 29, 2017

(86) PCT No.: PCT/AU2017/050917
§ 371 (c)(1),
(2) Date: Feb. 27, 2019

(87) PCT Pub. No.: WO2018/039711
PCT Pub. Date: Mar. 8, 2018

(65) Prior Publication Data
US 2019/0191962 A1    Jun. 27, 2019

(30) Foreign Application Priority Data

Aug. 29, 2016    (AU) ................. 2016903439

(51) Int. Cl.
| | |
|---|---|
| A47L 25/00 | (2006.01) |
| A47L 13/02 | (2006.01) |
| A47L 17/06 | (2006.01) |
| A47L 17/00 | (2006.01) |
| A47J 43/044 | (2006.01) |
| A47J 43/07 | (2006.01) |

(Continued)

(52) U.S. Cl.
CPC ............ *A47L 25/00* (2013.01); *A47L 13/02* (2013.01); *A47L 17/06* (2013.01); *A47J 43/044* (2013.01); *A47J 43/046* (2013.01); *A47J 43/07* (2013.01); *A47J 43/288* (2013.01); *A47L 17/00* (2013.01); *B08B 1/001* (2013.01)

(58) Field of Classification Search
CPC ........ A47L 25/00; A47L 13/02; A47L 13/022; A47L 13/08; A47L 17/00; A47L 13/11; A47L 17/06; A47J 43/044; A47J 43/046; A47J 43/288; A46B 2200/3073; A46B 3/22; A46B 3/20; A46B 9/005; B01F 15/00038; B01F 15/00058; B01F 15/00045; B01F 15/00019
USPC ...... 15/236.05–236.08, 142, 104.001, 167.2; D32/46–47
See application file for complete search history.

(56) References Cited

U.S. PATENT DOCUMENTS

| | | | | |
|---|---|---|---|---|
| 755,521 | A * | 3/1904 | Mortimer ................ | A47L 13/08 15/236.01 |
| 1,017,081 | A * | 2/1912 | Collins ................... | A47L 13/08 15/236.08 |

(Continued)

FOREIGN PATENT DOCUMENTS

| | | |
|---|---|---|
| GB | 191300876 | 1/1914 |
| GB | 802571 | 10/1958 |

*Primary Examiner* — Laura C Guidotti
(74) *Attorney, Agent, or Firm* — Sand, Sebolt & Wernow Co., LPA

(57) ABSTRACT

A tool with two sets of cleaning elements disposed at first and second radii about a common axis thus providing cleaning surfaces for all the spaces between a blender blade on a stepped shaft and its supporting base. Depending on the size of the step the cleaning elements are either vertical blades or nodules in the edge of a planar body.

7 Claims, 10 Drawing Sheets

(51) Int. Cl.
*A47J 43/28* (2006.01)
*A47J 43/046* (2006.01)
*B08B 1/00* (2006.01)

(56) References Cited

U.S. PATENT DOCUMENTS

| | | | |
|---|---|---|---|
| 1,058,705 A | * | 4/1913 | Guttinger ............ A01K 13/002 119/632 |
| 1,210,623 A | * | 1/1917 | Feser ............. A46B 2200/1066 15/167.2 |
| 4,709,717 A | * | 12/1987 | Rannigan ............ B05C 17/0245 134/199 |
| 6,213,055 B1 | | 4/2001 | Willinger et al. |
| 10,595,680 B2 | * | 3/2020 | Audet ..................... B08B 1/005 |
| 2004/0074035 A1 | * | 4/2004 | Huang ................... A46B 9/005 15/167.2 |
| 2008/0104780 A1 | | 5/2008 | Dayton et al. |
| 2012/0110768 A1 | * | 5/2012 | Baertschi ................ B26B 21/38 15/167.1 |

* cited by examiner

BLENDER CLEANING TOOL

FIELD OF THE INVENTION

The present invention relates to cleaning tools, in particular a tool for cleaning under the blades of a kitchen blender or similar appliance in which the blade shaft includes a step.

BACKGROUND TO THE INVENTION

The present invention is discussed in the context of a blender, but is not intended to be restricted to such an application, and is suitable for use with similar appliances with a rotating blade.

Blenders are a key appliance in many kitchens and are becoming increasingly popular with the advent of blenders that can also cook the food once it has been prepared. Whilst saving time in preparation, blenders are often difficult and time consuming to clean, particularly beneath the blades which are a well-known food trap. This problem is particularly bad for blenders with a step in the shaft below the blade.

Most people begin cleaning a blender with a conventional dish brush comprising a handle with a series of nylon bristles. Whilst effective on flat surfaces such brushes have difficulties in reaching into the small crevices beneath a blender blade. Alternative brushes are often tried such as small bottle brushes, babies tooth brushes and even icing nozzle cleaning brushes. Whilst offering some improvement over a conventional dish brush these alternative brushes are also found wanting.

Dedicated brushes for cleaning blenders are also known, but are little more than scaled down dish brushes and offer minimal improvement.

The object of this invention is to provide a cleaning tool to effectively clean under the blades of a blender to alleviate the above problems, or at least provide the public with a useful alternative.

SUMMARY OF THE INVENTION

In a first aspect the invention comprises a tool for cleaning a blender blade assembly with a stepped shaft, the tool comprising a handle and a head with a first set of cleaning elements disposed at a first height and at a first radius about a common axis, and a second set of cleaning elements disposed at a second height and at a second radius about the common axis.

Preferably the first set of cleaning elements comprise vertical blades, the second set of cleaning elements may also comprise vertical blades or nodules formed on the edge of a planar body.

In preference the cleaning elements are formed from a resilient material and are held by a pair of rigid arms of the head.

Preferably the blade assembly comprises a base with a top portion and sides disposed at a side angle to the top portion, and the tool further comprises an angled element joining the head to the handle, and the angled element is disposed at the side angle to the head. The angled element may also be a cleaning element.

It should be noted that any one of the aspects mentioned above may include any of the features of any of the other aspects mentioned above and may include any of the features of any of the embodiments described below as appropriate.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DRAWING COMPONENTS

Figure 1:
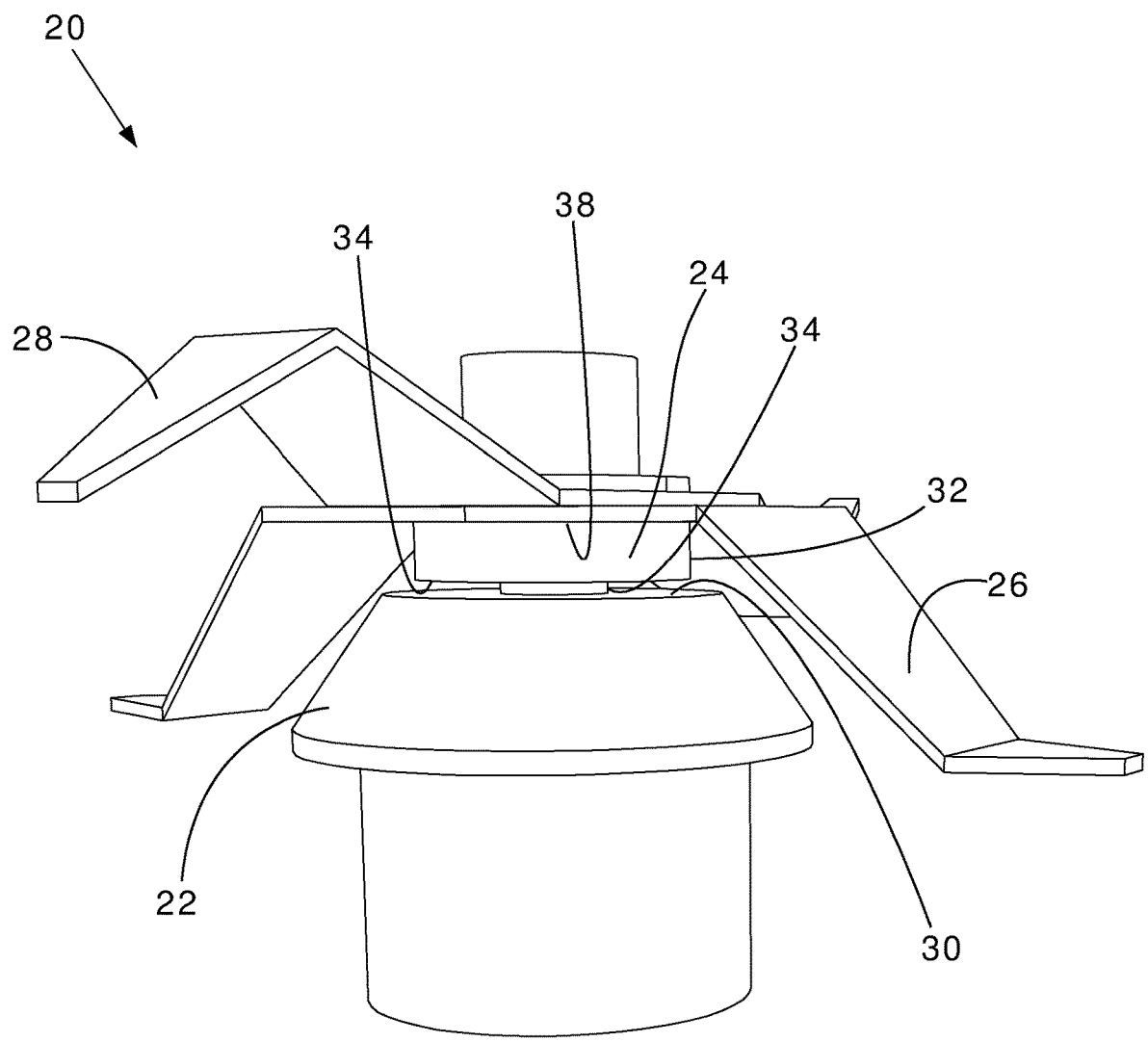
FIG. 1 shows a first type of blender blade with a relatively small gap.

The drawings include the following integers.

20 blender blade assembly (first type)
22 frustoconical base
24 stepped shaft
26 lower blade
28 upper blade
30 top surface of the base
32 lower section of the shaft
34 step of the shaft
36 upper section of the shaft
38 bottom surface of the lower blade
40 cleaning tool (first embodiment)
42 handle
44 neck
46 head
48, 49 arms
50 over-mould
52 planar body
54 shaft aperture
56 lower cleaning nodules
60 upper cleaning blades
62 inner face
64 top face
220 blender blade assembly (second type)
232 bottom section of the shaft
234 step of the shaft
240 cleaning tool (second embodiment)
248,249 arms
250 over-mould
256 lower cleaning blades
257 inner face
258 upper face
259 bottom face 260 upper cleaning blades
262 inner face

DETAILED DESCRIPTION OF THE INVENTION

The following detailed description of the invention refers to the accompanying drawings. Wherever possible, the same reference numbers will be used throughout the drawings and the following description to refer to the same and like parts. Dimensions of certain parts shown in the drawings may have been modified and/or exaggerated for the purposes of clarity or illustration.

The present invention provides an effective cleaning tool for removing debris from under the blades of a blender where a step is present in the blade shaft. The invention provides a correspondingly stepped arrangement of cleaning elements at two different radii to match the different radii of the shaft. The cleaning elements are disposed radially at different heights about a common axis. Two embodiments of the invention are described, with the first embodiment suited for a relatively small gap defined by the shaft step and the supporting base of the blade assembly and the second embodiment for a relatively large gap. The first embodiment will be described in detail. The second embodiment shares many features with the first embodiment so will only have its unique features discussed in detail.

Figure 6:
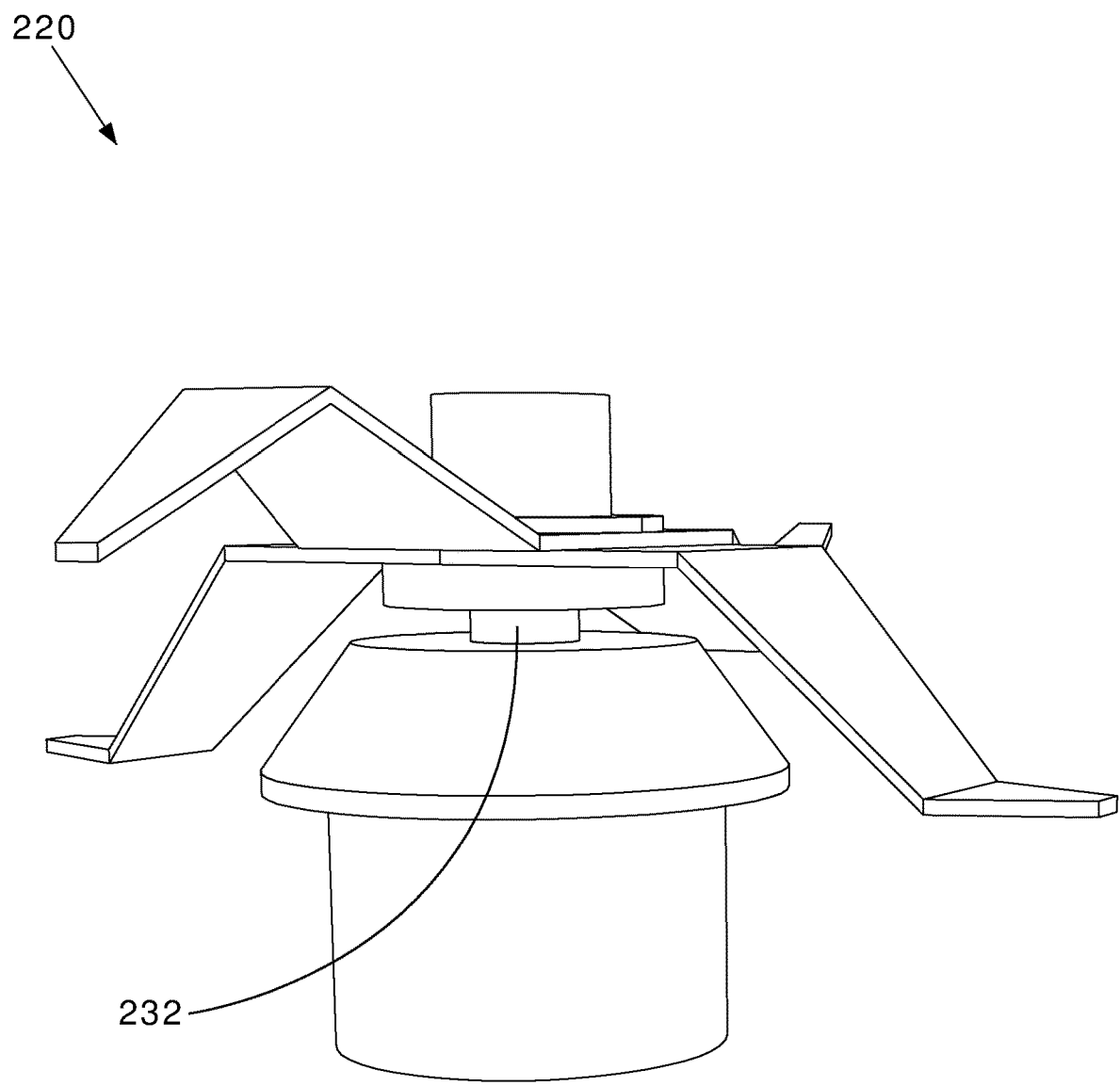
FIG. 6 shows a second type of blender blade with a relatively large gap.

A first blender blade assembly is shown as 20 in FIG. 1 and can be seen to comprise a frustoconical base 22, stepped shaft 24 to support the blades, lower blade 26, upper blade 28 and further elements not directly relevant to the invention. It can be readily appreciated that the region between the lower blade 26 and the base 22 contains regions that are difficult to access for cleaning, being the top surface 30 of the base, the lower section 32 of the shaft, the step of the shaft 34, the upper section 36 of the shaft and the bottom surface 38 of the lower blade. In particular the stepped in lower section 32 of the shaft is difficult to access. As discussed below the invention provides a tool that can simultaneously clean these difficult to access regions. A first embodiment of the invention is suitable for use with the blade assembly of FIG. 1 with a relatively small lower shaft section. A second embodiment of the invention is suitable for use with a blade assembly seen in FIG. 6 which has a relatively large lower shaft section.

Figure 2:
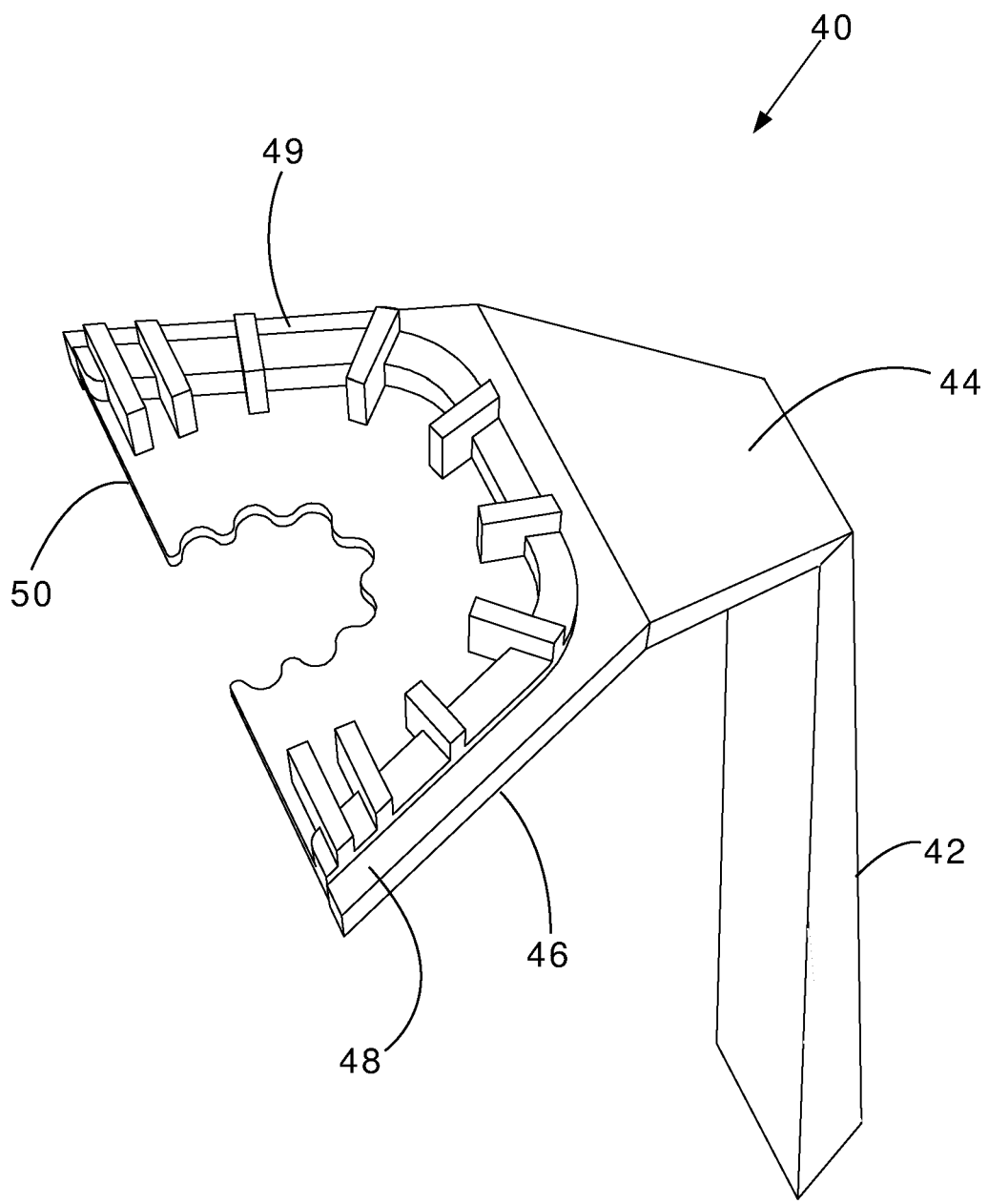
FIG. 2 shows a cleaning tool of a first embodiment of the invention suitable for use with the blender blade of FIG. 1.
Figure 3:
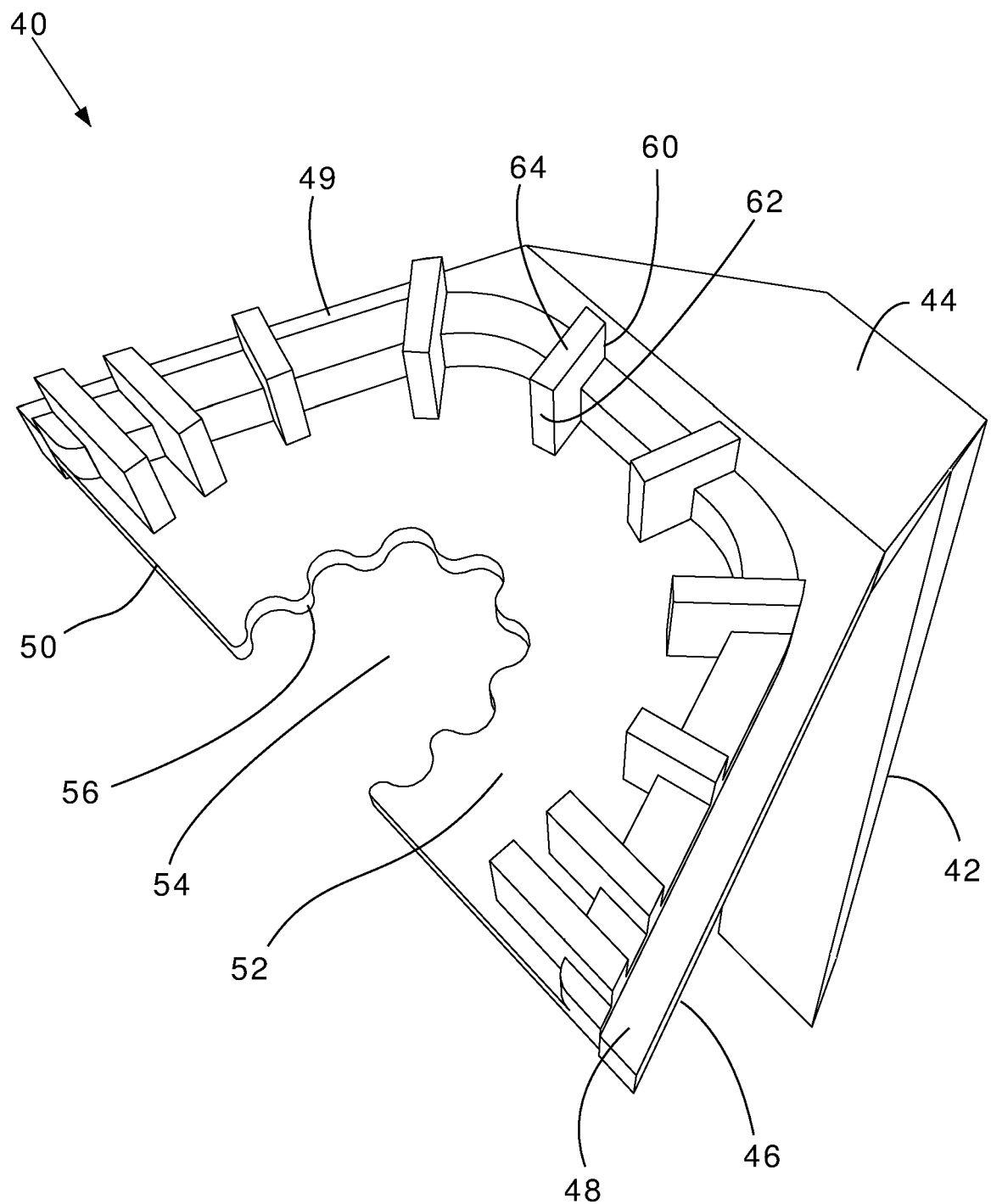
FIG. 3 shows a close up top view of the head of the cleaning tool of FIG. 2
Figure 4:
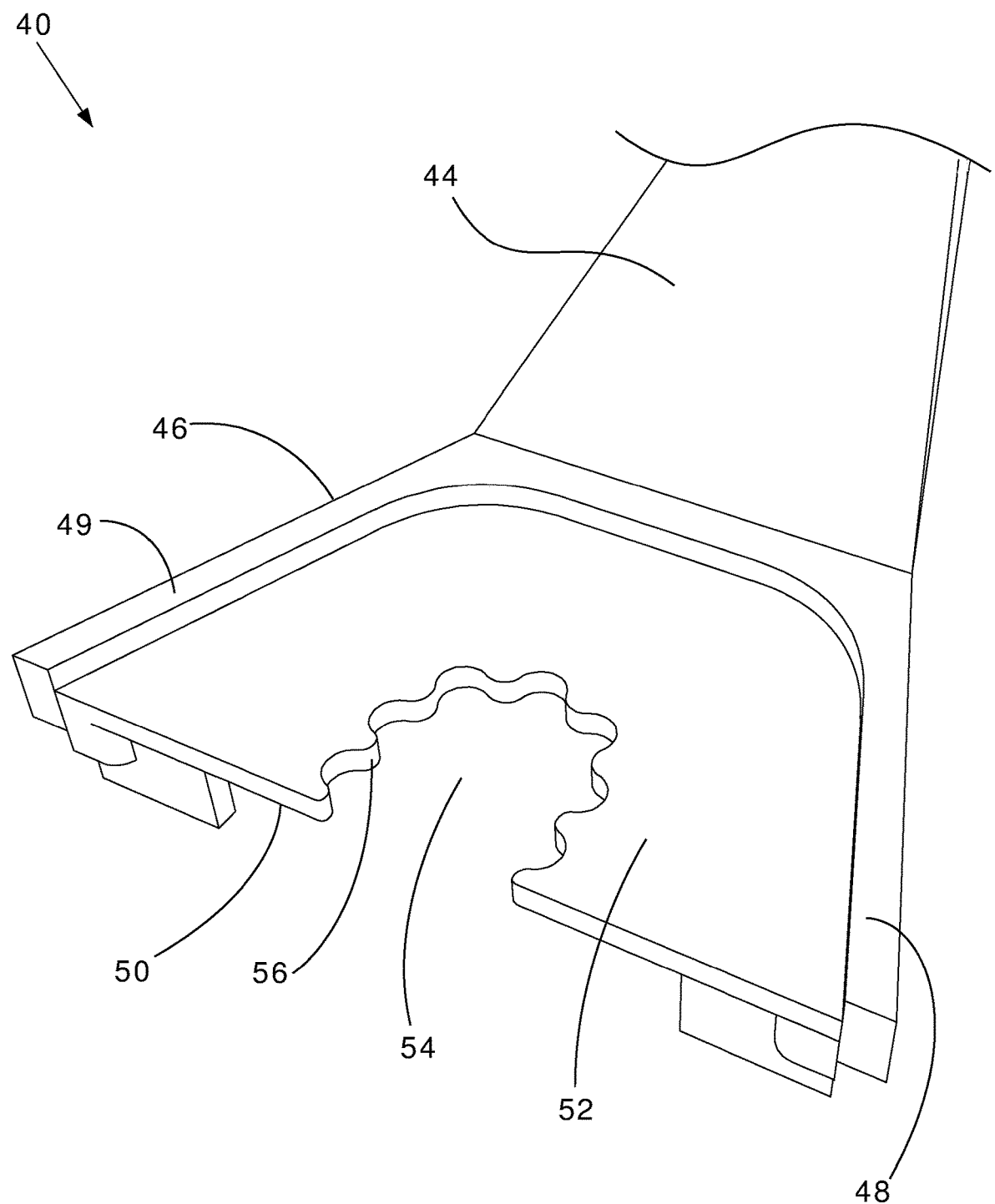
FIG. 4 shows a close up bottom view of the head of the cleaning tool of FIG. 2
Figure 5:
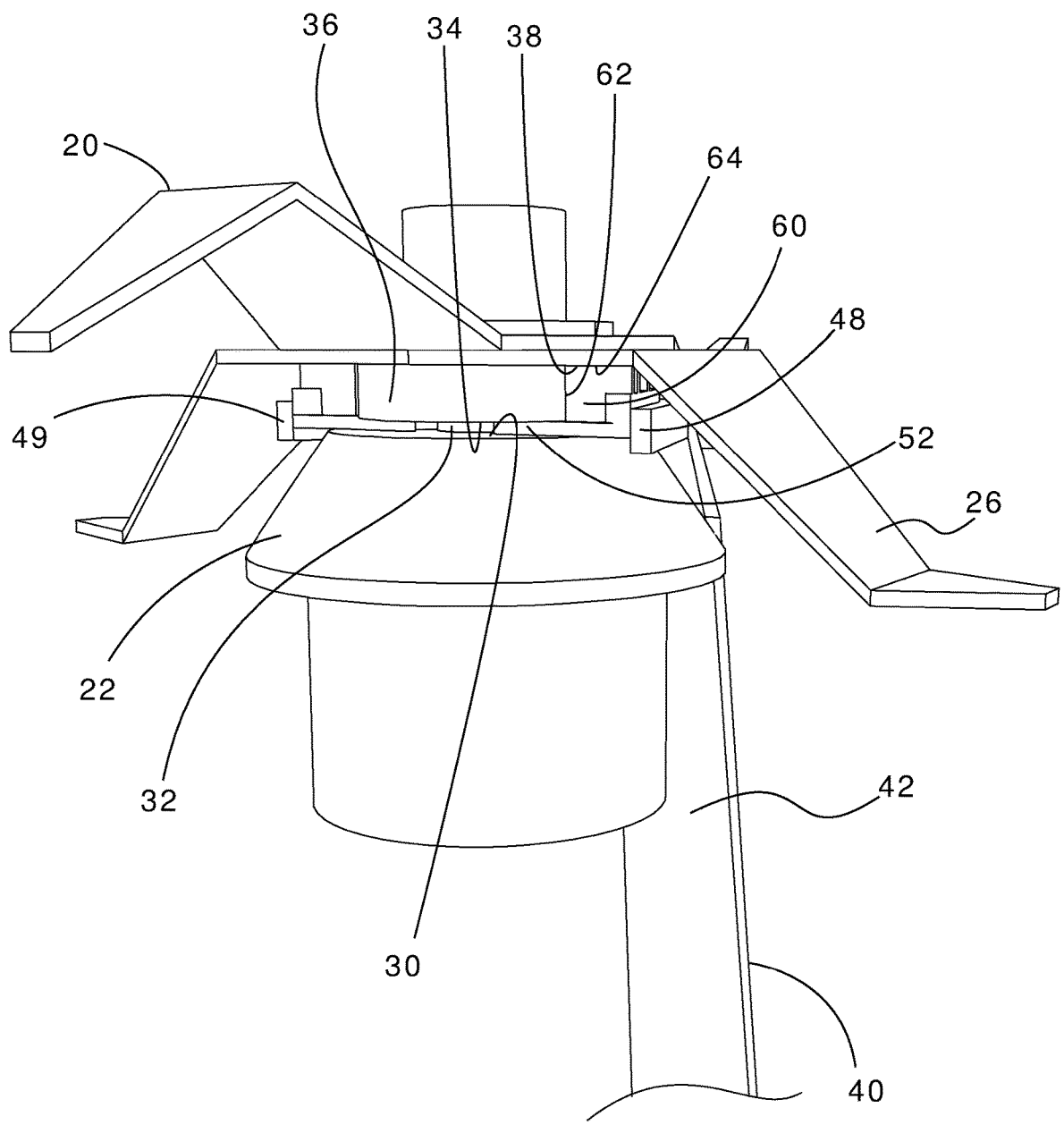
FIG. 5 shows the cleaning tool of FIG. 2 engaging the blender blade of FIG. 1

A first embodiment of the invention is shown as 40 in FIGS. 2 to 4, with FIG. 3 showing the entire tool, FIG. 4 showing the head of the tool in close up from above, and FIG. 5 showing the head of the tool in close up from below. The tool 40 provides a handle 42 supporting a cleaning head 46 via angled neck 44. The angled neck 44 is similar in size and angle to the sides of the base 22 allowing the tool to be maneuvered between the base 22 and the lower blades 26. The cleaning head 46 comprises two bifurcated arms 48 and 49 which support an over-mould 50 which incorporates various cleaning elements. The handle 42, neck 44 and head 46 are preferably made from a rigid material such as glass filled ABS plastic. The over-mould 50 is preferably made from a relatively soft and resilient material such as silicon rubber.

The over-mould 50 provides two sets of cleaning elements disposed at different heights and radii complementing the size and shape of stepped shaft 24. The first, or lower, set of cleaning elements are formed from a planar section of material 52 as it needs to operate in the gap between the step 34 and the top surface 30 of the base which is approximately 1 mm. The lower cleaning elements comprise the sheet itself, the bottom surface of which will act on the top surface of the base and the top surface which will act on the step, and a series of nodules 56 disposed in a semi-circle around shaft aperture 54 at a radius corresponding to the radius of the bottom section 32 of the shaft. The second, or upper, set of cleaning elements act on the upper section 36 of the shaft which is approximately 4 mm high, giving scope for a different physical format and comprise a series of blades 60 disposed in a semicircle at a radius corresponding to the radius of the upper section 36 of the shaft. The inner faces 62 of the blades will contact the upper section of the shaft whilst the upper surfaces 64 will contact the bottom surface 38 of the bottom blade 26.

FIG. 5 shows a cleaning tool 40 in use cleaning a blender blade assembly 20. Many of the elements of the tool are not visible in the figure, but can be appreciated from the description and previous figures. The tool 40 has been guided into position such that the arms 48 and 49 of the tool flank the stepped shaft between the base 22 and the lower blade 26 and the lower section of the shaft 32 sits within the shaft aperture 54. The lower cleaning elements come into action as the planar body 52 sits between the step 34 of the shaft and the top surface 30 of the base, whilst the nodules 56 contact the lower section of the shaft. The upper cleaning elements also come into action as the inner faces 62 of the blades 60 come into contact with the upper section of the shaft whilst the top face 64 of the blades 60 come into contact with the bottom surface 38 of the bottom blade 26. Once in position the tool 40 can be rotated about the blender blade shaft effecting a cleaning action by moving the various cleaning elements of the tool across the various features of the shaft, base and bottom blade.

Figure 7:
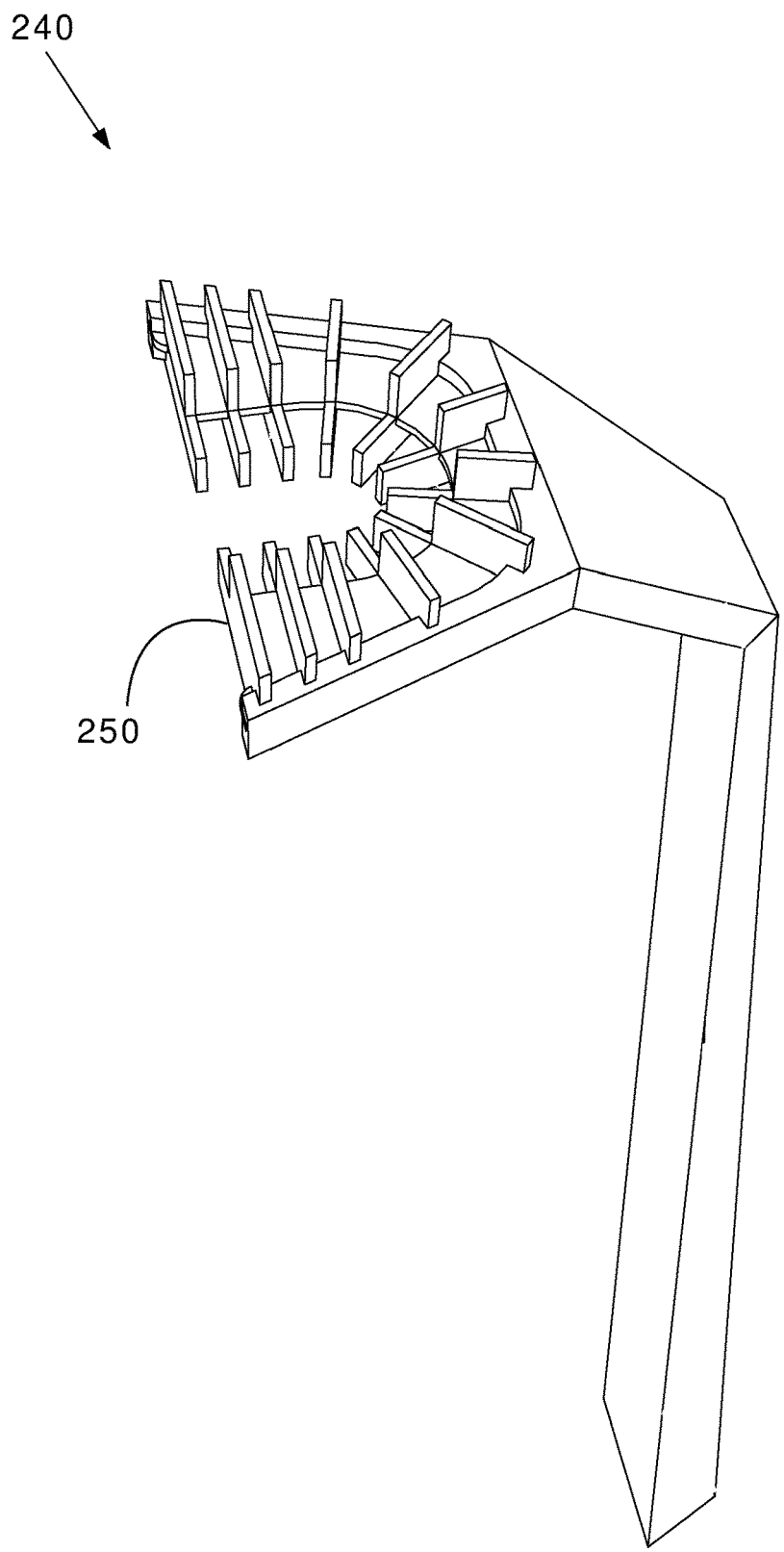
FIG. 7 shows a cleaning tool according to a second embodiment of the invention suitable for use with the blender blade of FIG. 6.
Figure 8:
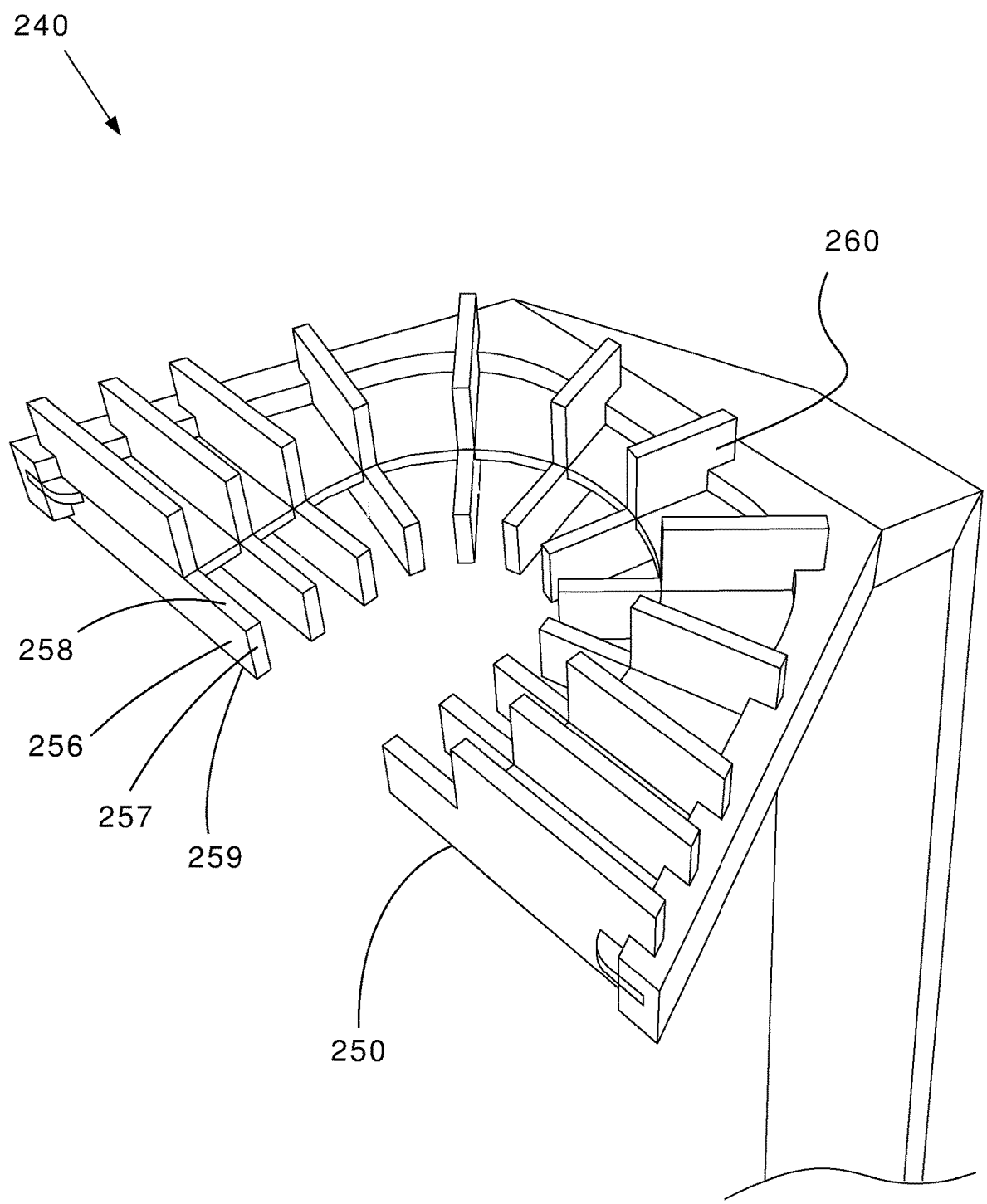
FIG. 8 shows a close up top view of the head of the cleaning tool of FIG. 7.
Figure 9:
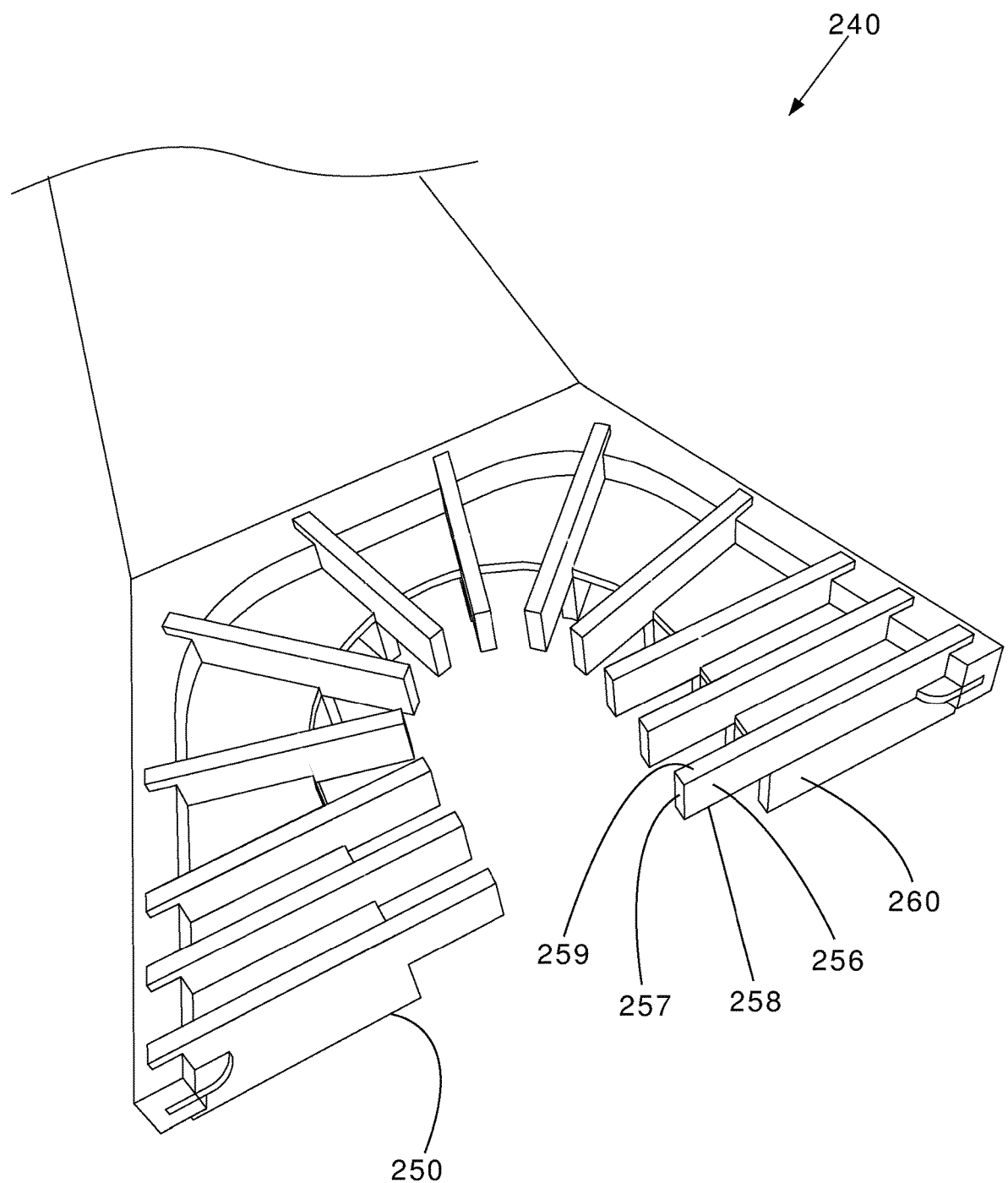
FIG. 9 shows a close up bottom view of the head of the cleaning tool of FIG. 7.

A second embodiment of a cleaning tool is shown as 240 in FIGS. 7 to 9, with FIG. 7 showing the entire tool, FIG. 8 showing the head of the tool in close up from above, and FIG. 9 showing the head of the tool in close up from below. The tool 240 has a series of upper cleaning blades 260 as per the upper cleaning blades 60 of the first tool. The lower cleaning elements differ from the first embodiment of the tool in also being a series of blades 256. The blades 256 are set in a semicircle around the shaft aperture at a radius such that the inner face 257 of the blades contacts the lower section 232 of the shaft. The upper face 258 of the blade 256 will contact the step of the shaft whilst the bottom face 259 will contact the top of the base.

Figure 10:
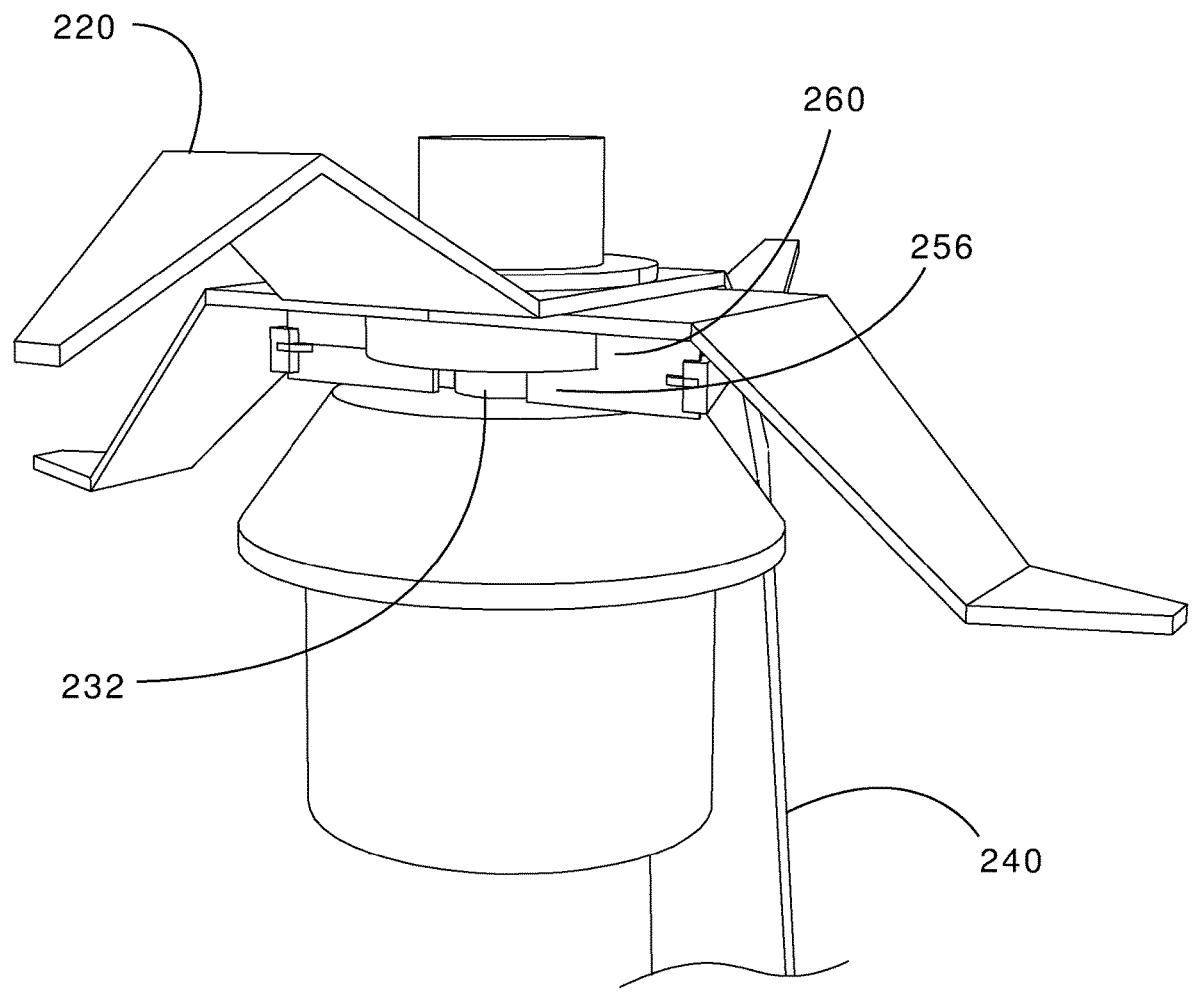
FIG. 10 shows the cleaning tool of FIG. 7 engaging the blender blade of FIG. 6.

Finally in FIG. 10 the second embodiment of the tool 240 is shown in use cleaning the second type of blender blade assembly 22. The upper blades 260 of the tool contact and clean the underside of the bottom blade and the top section of the shaft, whilst the lower blades 256 of the tool contact and clean the step in the shaft, the lower section of the shaft, and the top surface of the base.

In further embodiments (not shown) the first and second embodiments have the angled neck over-moulded with a silicon rubber or similar material to act as a further cleaning element to clean the sloping sides of the blender blade assembly base.

The reader will now appreciate the present invention which provides an effective cleaning tool for cleaning under the blades of a blender or similar appliances with a stepped shaft. Two sets of cleaning elements are disposed at different heights and at different radii to match the structure of the blender between the blades and the blade assembly base. The features of the tool are able to simultaneously reach all surfaces in the region thus providing a quick and easy cleaning.

Further advantages and improvements may very well be made to the present invention without deviating from its scope. Although the invention has been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

The invention claimed is:

1. A tool for cleaning a blender blade assembly with a stepped shaft, the tool comprising a handle and a head with a first set of cleaning elements disposed at a first height and in a semi-circle at a first radius about a common axis, and a second set of cleaning elements disposed at a second height and in a semi-circle at a second radius about the common axis, wherein the head comprises a pair of rigid arms holding the first set of cleaning elements and the second set of cleaning elements, and wherein the first set of cleaning elements is arranged in a first plane and the second set of cleaning elements is arranged in a second plane, and the second plane is different from the first plane.

2. The tool as in claim 1, wherein the first set of cleaning elements comprise vertical blades.

3. The tool as in claim 2, wherein the second set of cleaning elements comprise nodules formed on an edge of a planar body.

4. The tool as in claim 2, wherein the second set of cleaning elements comprise vertical blades.

5. The tool as in claim 1, wherein the first set of cleaning elements and the second set of cleaning elements are formed from a resilient material.

6. The tool as in claim 1 wherein cleaning elements of the first set of cleaning elements and cleaning elements of the second set of cleaning elements are all directed towards the common axis.

7. The tool as in claim 1, wherein the first set of cleaning elements is radially spaced a distance outwardly away from the second set of cleaning elements.

\* \* \* \* \*